United States Patent [19]

Teyssandier

[11] 4,050,324

[45] Sept. 27, 1977

[54] TRANSMISSION GEAR MECHANISM

[76] Inventor: Gaston Teyssandier, 1645 Maisonneuve Blvd., Apt. 2110, Montreal, Quebec, Canada, H3H 2N3

[21] Appl. No.: 731,508

[22] Filed: Oct. 12, 1976

[51] Int. Cl.² .................... F16H 35/06; F16H 35/02; F16H 55/04
[52] U.S. Cl. ........................................ 74/397; 74/393; 74/437
[58] Field of Search ................. 74/325, 339, 392, 393, 74/437, 397

[56] References Cited

U.S. PATENT DOCUMENTS 2,021,935  11/1935  Griswold ............................. 74/397

Primary Examiner—Leonard H. Gerin

[57] ABSTRACT

A transmission gear mechanism having a plurality of drive gears and a shiftable driven gear. Eccentric gears are provided between the drive gears to smoothly transfer the driven gear from one drive gear to the next during shifting without interrupting the power transmission. Bearing surfaces are provided to bias the driven gear into contact with the drive and eccentric gears at all times to maintain power transmission.

8 Claims, 7 Drawing Figures

TRANSMISSION GEAR MECHANISM

This invention is directed toward an improved transmission gear mechanism of the type employing a set of variable diameter drive gears with means for transferring a driven gear from one drive gear to the next without interruping the transmission of power.

Transmission gear mechanisms of the above type are well known, as shown in U.S. Pat. No. 790,350 for example, and are quite useful in transmitting power in relatively slowly rotating power systems such as lathes or milling machines.

The known mechanisms however employ relatively complicated, and thus expensive means for shifting the driven gear and, for maintaining the driven gear in contact with the drive gears.

It is the purpose of the present invention to provide a transmission gear mechanism of the above type which is relatively simple in construction and use and thus relatively inexpensive. The transmission gear mechanism of the present invention comprises drive means including a drive shaft and drive gears of gradually differing diameters mounted for rotation on the drive shaft; driven means including a driven shaft, parallel to and movable toward and away from the drive shaft, and a driven gear mounted on the driven shaft to be movable axially therealong and to be kept in mesh with the drive gears, selectively; means for so moving the driven gear along the driven shaft to shift it from one drive gear to the next. The drive means also comprises transfer means to assist the gear in moving from one drive gear to the next during the shifting movement. There is finally provided means to hold the driven gear in mesh with the drive means at all times.

According to a preferred embodiment of the invention, the transfer means comprises eccentric gears between adjacent drive gears, the eccentric gears being so sized and disposed that diametrically opposed peripheral portions thereof merge with the peripheral portions of the adjacent drive gears to allow smooth transfer of the driven gear therebetween during shifting. Preferably, the holding means comprises a bearing shaft parallel to and in the same plane as the driving and driven shafts with the driven shaft being disposed and movable between the drive and bearing shaft; biasing members mounted for rotation on the bearing shaft, such biasing members having peripheral bearing surfaces; a bearing member on the driven shaft contacting the bearing surfaces, the biasing members and bearing member being formed to bias the driven gear against the drive means, and means rotating the bearing shaft in unison with the drive shaft.

An embodiment of the invention will now be described in detail having reference to the accompanying drawings in which.

Figure 1:
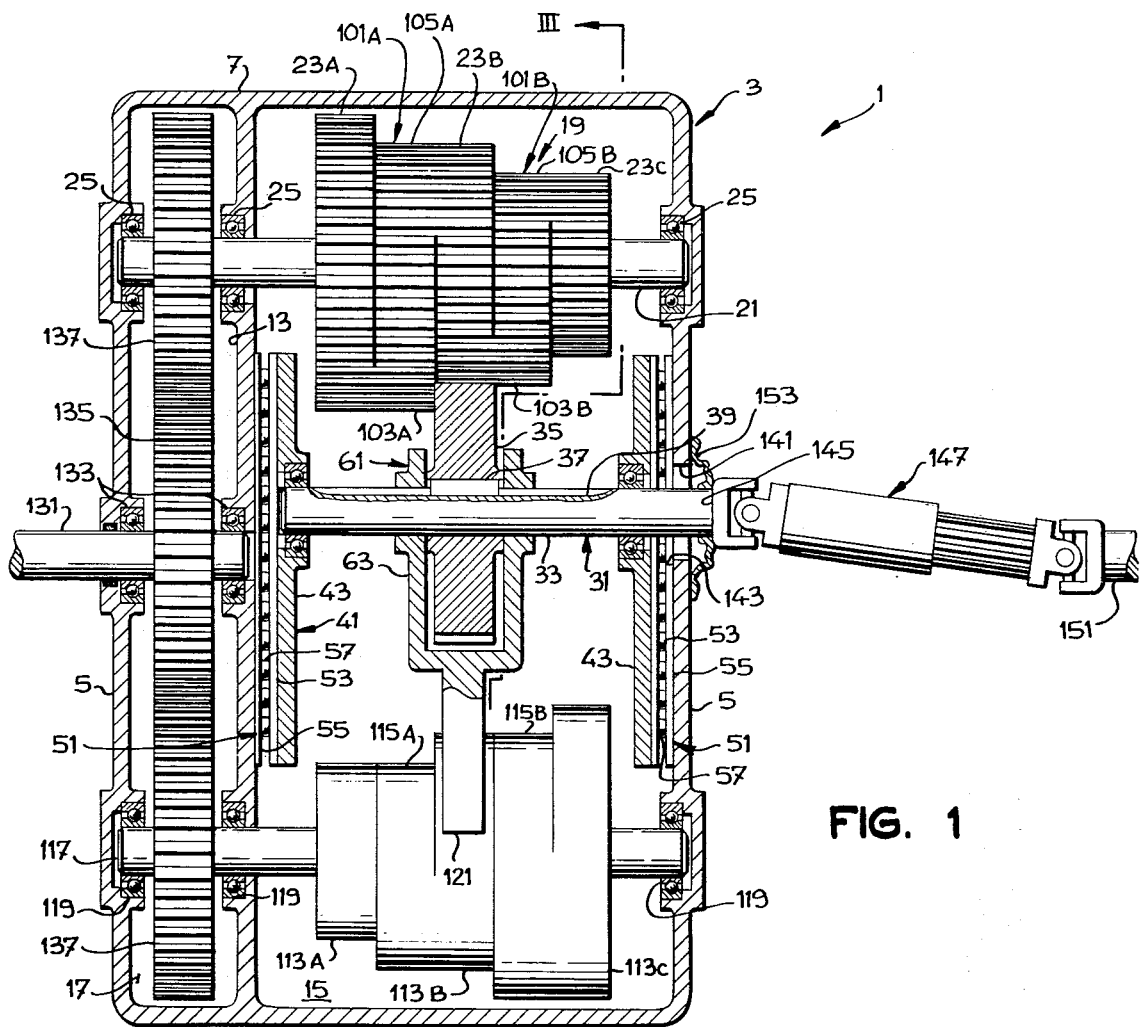
FIG. 1 is a plan view of a transmission gear mechanism embodying the invention.
Figure 2:
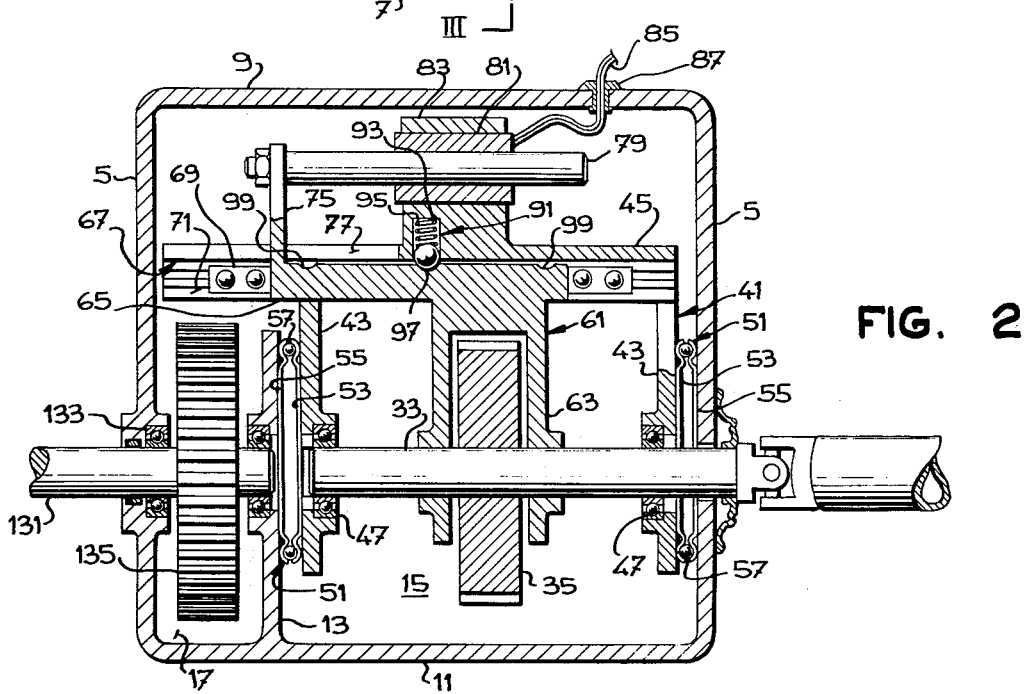
FIG. 2 is a partial cross-section view of the transmission gear mechanism of FIG. 1, through the input and driven shafts.

The illustrated transmission gear mechanism 1 has a housing 3 defined by sidewalls 5, end walls 7, a top wall 9, and a bottom wall 11. A partial intermediate wall 13 extends up from bottom wall 11, between end walls 7. The intermediate wall 13 lies close to one of the sidewalls 5 and divides the bottom part of the housing 3 into a large and small chamber 15, 17 respectively.

Drive means 19 are mounted within housing 3 along one end wall 7. The drive means 19 has a drive shaft 21 and a plurality of drive gears 23A, 23B, 23C fixed on the shaft 21 within chamber 15. The shaft 21 extends between sidewalls 5, and through intermediate wall 13, and is substantially parallel to the end walls 7. Bearings 25, in walls 5 and 13, rotatably mount the shaft 21.

Driven means 31 are also mounted in the housing 3 generally centrally between end walls 7 and within chamber 15. The driven means 31 has a driven shaft 33, parallel to drive shaft 21, and a driven gear 35 mounted on driven shaft 33. The driven gear 35 is mounted to move axially on shaft 33, but rotatably therewith, through the use of a key 37 and an elongated keyway 39 on shaft 33.

The driven shaft 33 is mounted at its ends in a sliding frame 41. The frame 41 has a pair of parallel, vertical end walls 43 joined to a horizontal top plate 45. The top plate 45 extends between sidewalls 5 over the top of intermediate wall 13. End walls 43 lie within chamber 15 adjacent one sidewall 5 and intermediate wall 13. Bearings 47 rotatably mount shaft 33 in end plates 43. The frame 41 is mounted to slide in a direction perpendicular to shafts 21, 33. Bearings 51, between end plates 43 and the adjacent sidewall 5 and intermediate wall 13 permit the frame 41 to slide. Each bearing 51 has one backing plate 53 on an end plate 43 and another backing plate 55 on the adjacent side or intermediate wall. The backing plates 53, 55 retain two rows of ballbearings 57 between them along which plates 53, and thus frame 41, can slide relative to plates 55 on side and intermediate walls 5, 13.

Figure 3:
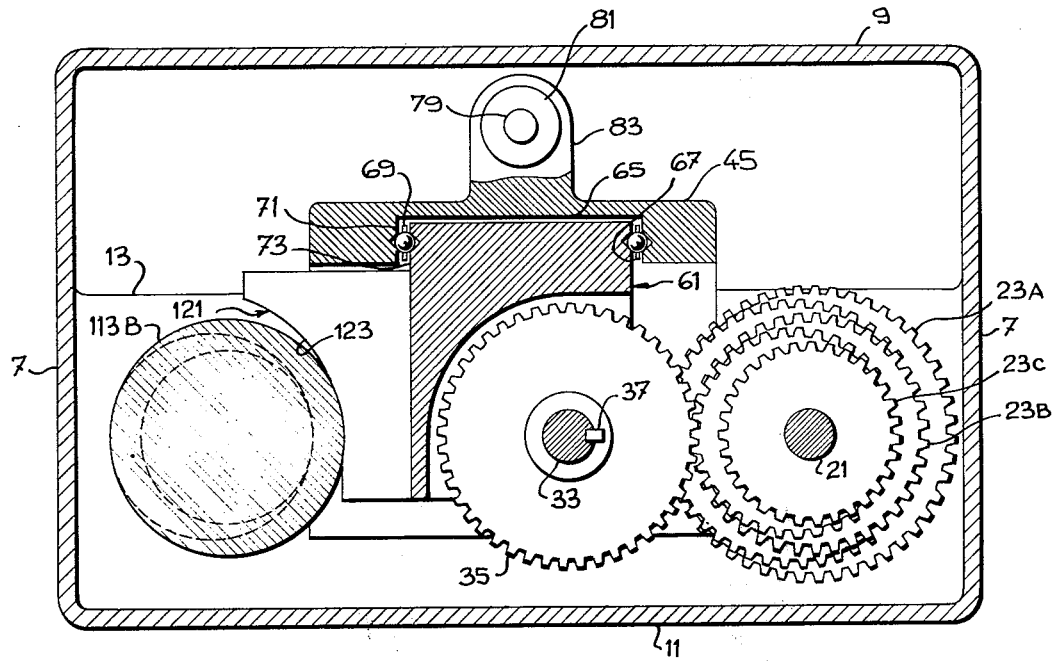
FIG. 3 is a partial cross-section view along line III—III of FIG. 1.

Shifting means 61 are provided for shifting driven gear 35 axially along shaft 33 from one drive gear 23 to another. The shifting means 61 has a shifting yoke 63 mounted over driven gear 35 and slidable on shaft 33. The yoke 63 contacts the sides of gear 35. The yoke 63 extends down from a mounting plate 65 which is mounted to slide in a direction parallel to shafts 21, 33 in a bottom groove 67 (FIG. 3) in top plate 45 of sliding frame 41. Preferably, bearing means 69 are provided between the sidewalls 71 of groove 67 and sides 73 of mounting plate 65.

An arm 75 extends up from one end of mounting plate 65 through a slot 77 in top plate 45 of sliding frame 41. The arm 75 is connected to one end of a solenoid plunger 79, slidable in a solenoid coil 81. The coil 81 is mounted on a block 83 extending up from top plate 45 of sliding frame 41. Plunger 79 is parallel to shafts 21, 33 and slides in an axially direction. Wires 85 supply power to coil 81, entering housing 3 through a grommet 87 in top wall 9. It will be understood that coil 81 can be activated to move rod 79 in either direction.

Spring loaded detent means 91 are provided for locating the shifting means 61 in one of three positions relative to sliding frame 41. These three positions locate driven gear 35 opposite the three drive gears 23. The detent means 91 has a blind hole 93 in top plate 45 of sliding frame 41 opening toward mounting plate 65. A spring 95 is placed in hole 93 to bias a ball 97 against plate 65 and to sit in one of three detents 99 formed in the top surface of plate 65. The detents 99 define the three positions, and thus prevent driven gear 35 from changing its position relative to drive means 19 when it is not shifted by transfer means.

Transfer means are provided on driven means 31 for shifting driven gear 35 from one drive gear to another without losing gear contact between the drive means 19 and drive means 31. These transfer means comprise eccentric gears 101A, 101B mounted on drive shaft 21 between drive gears 23. Eccentric gear 101A is located between drive gears 23A, 23B and has a first portion 103A of its gear surface substantially corresponding to, adjacent and aligned with, the gear surface of drive gear 23A; and a second portion 105A, one hundred and eighty degrees from first portion 103A, corresponding to, adjacent and aligned with, the gear surface of drive gear 23B. In shifting gear 35 from gear 23A to 23B, it will move smoothly axially from gear 23A onto aligned portion 103A of eccentric gear 101A, travel one hundred and 80° about gear 101A to portion 105A and from here, shift laterally onto gear 23B. Eccentric gear 101B, located between gears 23B and 23C has similar gear surface portions 103B, 105B spaced one hundred and eighty degrees apart. Surface portion 103B is aligned with gear 23B, one hundred and eighty degrees from where portion 105A on gear 101A is aligned with gear 23B, and surface portion 105B is aligned with gear 23C.

Biasing means 111 are provided to maintain driven gear 35 in gear contact with the drive gears 23, and the eccentric gears 101 at all times including during shifting. The biasing means 111 comprise cylindrical and eccentric cam bearing surfaces 113, 115 rotatably mounted on a bearing shaft 117. The shaft 117 is parallel to shafts 21, 33 and all three shafts lie in the same plane. Shaft 117 is rotatably mounted by bearings 119 in sidewalls 5 and intermediate wall 13. The cylindrical cam bearing surfaces 113A, 113B, 113C are smooth and are located opposite drive gears 23A, 23B and 23C respectively. Bearing surface 113A has the same perimeter as gear 23C; bearing surface 113B the same perimeter as gear 23B; and surface 113C the same perimeter as gear 23A. The eccentric cam bearing surfaces 115A, 115B are also smooth and are located opposite eccentric gears 101A, 101B respectively, and surface 115A has the same perimeter as gear 101B and surface 115B has the same perimeter as gear 101A. Eccentric surface 115A provides a smooth lateral transition between cylindrical surfaces 113A and 113B and eccentric surface 115B provides a smooth lateral transition between cylindrical surfaces 113B and 113C.

A bearing member 121, aligned with driven gear 35 extends from yoke 63. The bearing member 121 has a curved contact surface 123, FIG. 3, which contacts any one of the bearing surfaces 113, 115. It will be noted that the distance between any gear 23, 101 and its respective opposed bearing surface 113, 115 is the same as the distance between the other gears 23, 101 and their respective bearing surfaces 113, 115. This distance equals the distance between the outside of driven gear 35 and the point of contact on contact surface 123.

An input drive shaft 131 extends into chamber 17 of housing 3. The shaft 131 is mounted in bearings 133 in sidewall 5 and intermediate wall 13. A primary input gear 135 is mounted on shaft 131 in chamber 17. Primary input gear 135 drives secondary input gears 137, 139 mounted on shafts 21, 117 respectively. Gears 137, 139 are of the same size and are located in chamber 17.

Driven shaft 33 extends out from housing 3 through a slot 141, FIG. 1, in sidewall 7, and an aligned slot 143 in fixed plate 55 of bearing 51. The projecting end 145 of shaft 33 is connected by a universal joint structure 147 to an output shaft 151. A flexible seal 153, mounted at the end 145 of shaft 33, closes slot 141.

In operation, having reference to FIG. 5, power is transmitted through the transmission gear mechanism 1 as follows: from input shaft 131 to input gear 135, to secondary input gear 137, to drive shaft 21, to one of the different diameter drive gears 23, to driven gear 35, to driven shaft 33, to universal joint 147, and output shaft 151. The ratio in size between the selected drive gear 23 and driven gear 35 determines the speed of output shaft 151.

Figure 5A:
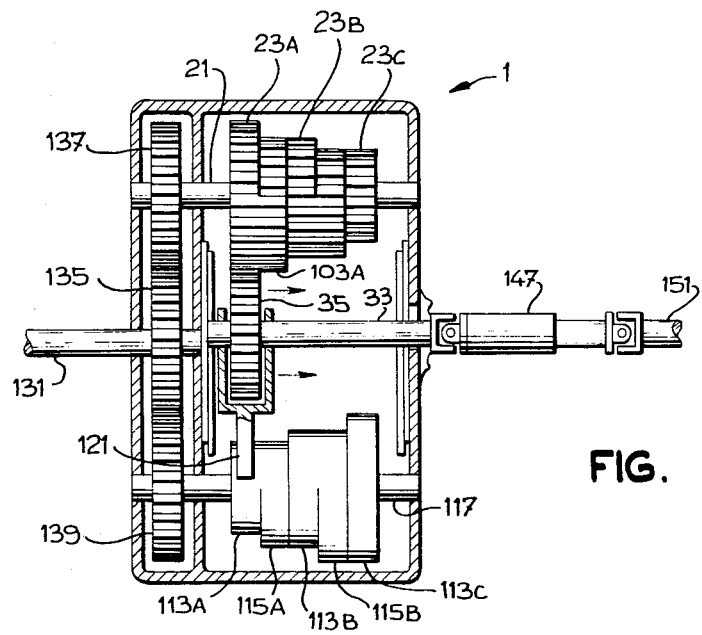
FIGS. 5A, 5B and 5C are views similar to FIG. 1 showing the operation of the mechanism.
Figure 5B:
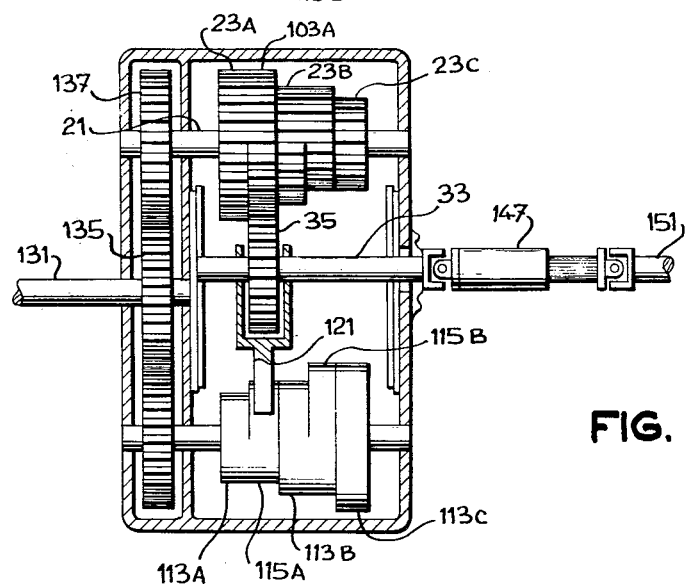
Figure 5C:
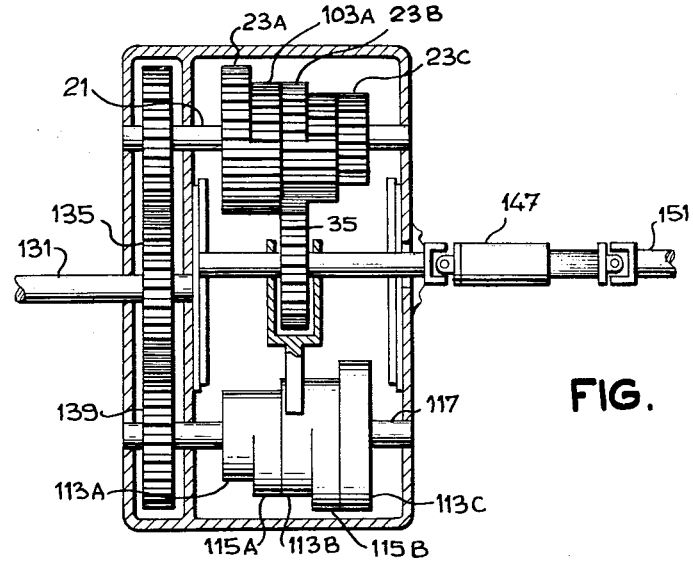

Assume driven gear 35 is positioned to be driven by drive gear 23A as shown in FIG. 5A. Driven gear 35 is maintained in contact with drive gear 23A due to the contact surface 123 of bearing member 121 contacting bearing surface 113A. The bearing surfaces 113, 115 are being rotated by secondary input gear 139 from primary input gear 135 at the same speed as gears 23 are being rotated. Assume now that it is desired to change the output speed. Solenoid coil 81 is actuated and driven gear 35 is shifted laterally by movement of solenoid plunger 79 when portion 103A of eccentric gear 101A, aligned with drive gear 23A, is facing driven gear 35 and when the aligned bearing surface portions on surfaces 113A, 115A face contact surface 123. The shifting yoke 63 is moved laterally, via arm 75 and plate 65, when the solenoid 81 is actuated to shift driven gear 35 from drive gear 23A to eccentric gear 103A. At the same time, contact member 121 shifts laterally from cylindrical bearing surface 113A to eccentric bearing surface 115A which serves to maintain the driven gear in contact with the eccentric gear 101A as shown in FIG. 5B. After eccentric gear 101A has rotated through one hundred and eighty degrees, the solenoid completes the gear change laterally shifting driven gear 35 from the eccentric gear 101A to drive gear 23B and detent means 91 locks gear 35 in place. At the same time, the contact member 121 shifts laterally from the eccentric gearing surface 115A to the larger cylindrical surface 113B to maintain driven gear 35 in contact with drive gear 23B as shown in FIG. 5C. The portion of cylindrical surface 113B, offset relative to eccentric surface 115A, prevents premature shifting of gear 35 until both gear 101A and surface 115A have rotated the one hundred and eighty degrees. The arrangement of the cylindrical and eccentric bearing surfaces relative to the drive and eccentric gears is such as to always maintain the driven gear in contact with the drive and eccentric gears.

Figure 4:
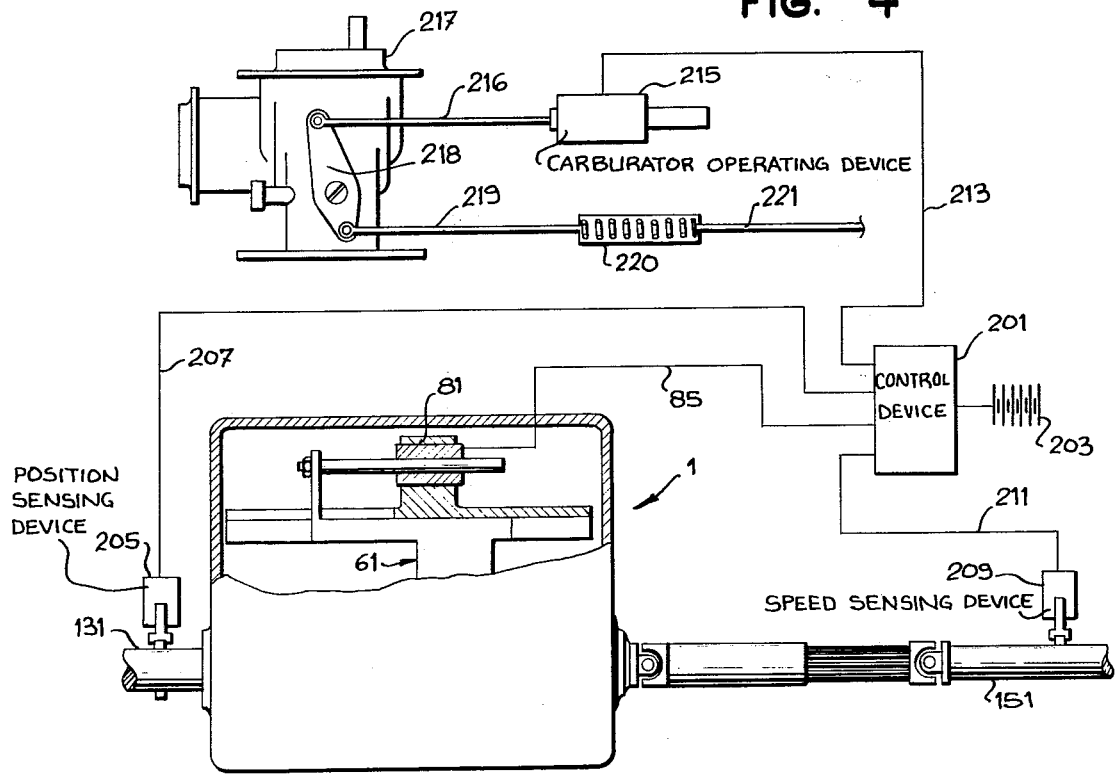
FIG. 4 is a schematic view showing the transmission gear mechanism automatically employed with an engine.

FIG. 4 is intended to show, diagrammatically, how the transmission mechanism 1 of the invention can be used automatically.

In this arrangement, a position sensing device 205 is mounted on the driven shaft 131 to be responsive to appropriate triggering means on diametrically opposite points of the said shaft 131. These points are located on the shaft 131 to correspond respectively to the transfer portions 103A, 105A and 103B, 105B of the eccentric gears 101A, 101B. When the sensor of the position sensing device 205 thus reaches one of those points, a signal is sent to a control device 201 through connecting wire 207, control device 201 being powered by a source 203.

Similarly, a speed sensing device 209 is mounted on the driven shaft 151 to be responsive to predetermined speeds, proportional for instance to 15 and 30 mph of the vehicle. At each speed, the sensing device 209 sends, through connecting wire 211, a signal to the control device 201.

Assuming the vehicle on which the aforesaid system is mounted starts from rest and reaches to 15 mph, then speed sensing device 209 sends a signal to the control device 201 simultaneously with the signal coming from the position sensing device 205 as soon as the latter has reached one of the two diametrically opposed positions mentioned above. At that time, the control device 201 reacts to send an operating signal through a connecting wire 85 energizing the solenoid 81 thereby operating the shifting means 61 to move the driven gear 35 onto an adjacent eccentric transfer gear. Then when the position sensing device 205 is, after half a turn of the shaft 131, again triggered, the solenoid 81 is energized anew to shift the driven gear 35 onto the adjacent drive gear.

The same action will take place when the vehicle reaches 30 mph. It will be understood that a similar action will take place when the speed of the driven shaft 151 decreases. For this purpose, the control device 201 will send an operating signal which will move backwards the solenoid 81 and thus the driven gear 35.

In both instances of gear changing, a further signal is also sent, through a connecting wire 213, to a carburator operating device which can also be a solenoid of which the plunger 216 is connected to one end of a lever 218 of a carburator 217, thereby closing the latter. The other end of the carburator level 218 is connected in turn by rod 219 to a spring device 220 fixed by means of a rod 221 to the acceleration pedal. In this manner, as soon as the solenoid 81 of the transmission gear mechanism 1 is actuated, the carburator closes so that the vehicle is no longer powered and any attempt by the driver to accelerate by pressing the pedal only results in compressing the spring of the spring means 220 which is otherwise, stiff enough to cause rods 219, 221 to act as one member.

Of course, the control device is so conceived that the energizing period of the solenoid 81 and of the carburator operating device 215 lasts only long enough to permit gear shifting.

It will thus be seen that the above-described system, using a transmission gear mechanism 1 according to the invention is quite simple in construction and in operation as well as being well adopted for transmitting the output of relatively low speed machines, as, for example, machine tools, trucks.

I claim:

1. A transmission gear mechanism comprising:
    drive means including a drive shaft and drive gears of gradually differing diameters mounted for rotation on said drive shaft;
    driven means including a driven shaft, parallel to and movable toward and away from said drive shaft, and a driven gear mounted on said driven shaft to be movable axially therealong and to be kept in mesh with said drive gears, selectively;
    means for so moving said driven gear along said drive shaft to shift it from one drive gear to the next, wherein said drive means comprises transfer means to assist the driven gear in moving from one drive gear to the next during said shifting; and
    means to hold the driven gear in mesh with the drive means at all times.

2. A transmission gear mechanism as claimed in claim 1, wherein said transfer means comprises eccentric gears between said drive gears, said eccentric gears being so sized and disposed that diametrically opposite peripheral portions thereof merge with the peripheral portions of said adjacent drive gears to allow smooth transfer of said driven gear therebetween during shifting.

3. A transmission gear mechanism as claimed in claim 2, wherein said holding means comprises:
    a bearing shaft parallel to and in the same plane as said drive and driven shafts with said driven shaft being disposed and movable between said drive and bearing shafts;
    biasing members mounted for rotation on said bearing shaft, said biasing members having peripheral bearing surfaces;
    a bearing member on said driven shaft contacting said biasing surfaces, constructed so that said biasing members and bearing member bias said driven gear against said drive means; and
    means rotating said bearing shaft in unison with said drive shaft.

4. A transmission gear mechanism as claimed in claim 3, wherein said bearing surfaces comprise cylindrical surfaces aligned with said drive gears, and eccentric surfaces aligned with said eccentric gears.

5. A transmission gear mechanism as claimed in claim 4, wherein the distance between any of said drive and eccentric gears, and their corresponding bearing surfaces, at any time, is constant.

6. A transmission gear mechanism as claimed in claim 2, including an input shaft, an output shaft; means connecting said input shaft to both said drive shaft and said bearing shaft to rotate them at the same speed; and universal joint means connecting said driven shaft to said output shaft.

7. A transmission gear mechanism as claimed in claim 1, wherein said means for moving the driven gear along the driven shaft comprises a yoke connected to said driven gear, a solenoid coil, a solenoid plunger within said coil and extending parallel to said driven shaft, and means connecting said yoke to said plunger.

8. A transmission gear mechanism as claimed in claim 7, including a frame slidable to move in a direction perpendicular to said drive and driven shafts; said driven shaft rotatably mounted in said sliding frame, said yoke slidably mounted in said sliding frame to move in a direction parallel to said drive and driven shafts; said solenoid means being fixed to said sliding frame.

* * * * *